(No Model.)

C. F. HILL.
SAW FILING DEVICE.

No. 319,489. Patented June 9, 1885.

WITNESSES:
J. Gilbert Shisley
Ph. Bergmann

INVENTOR
Charles F. Hill
BY
Frank S. Taft
ATTORNEY

UNITED STATES PATENT OFFICE.

CHARLES FRANK HILL, OF PHELPS, ASSIGNOR OF ONE-HALF TO RUPERT WAGNER, OF ROCHESTER, NEW YORK.

SAW-FILING DEVICE.

SPECIFICATION forming part of Letters Patent No. 319,489, dated June 9, 1885.

Application filed January 2, 1885. (No model.)

*To all whom it may concern:*

Be it known that I, CHARLES F. HILL, a citizen of the United States, residing at Phelps, in the county of Ontario and State of New York, have invented a new and useful Improvement in Saw-Filing Machines, of which the following is a specification.

My invention consists in providing an accurate and undeviating guide for files used in filing saws, and in securing the same in a simple and effectual manner, so that comparatively unskilled persons may by its use attain a degree of perfection in the filing or sharpening of saws unattainable by those skilled in that branch who depend solely upon practice and their judgment in determining the proper cutting pitch of teeth and the uniformity of the same without mechanical aids or guides.

The filing of a saw as ordinarily accomplished, without mechanical guides, being a slow and necessarily tedious operation to insure accuracy, the use of my device results in the following advantages: a saving of time, absolute uniformity in the teeth, a ready and secure adjustment of the file, and the utilization of the entire cutting surface thereof. I attain these objects by the mechanism illustrated in the accompanying drawings, in which—

Figure 1:
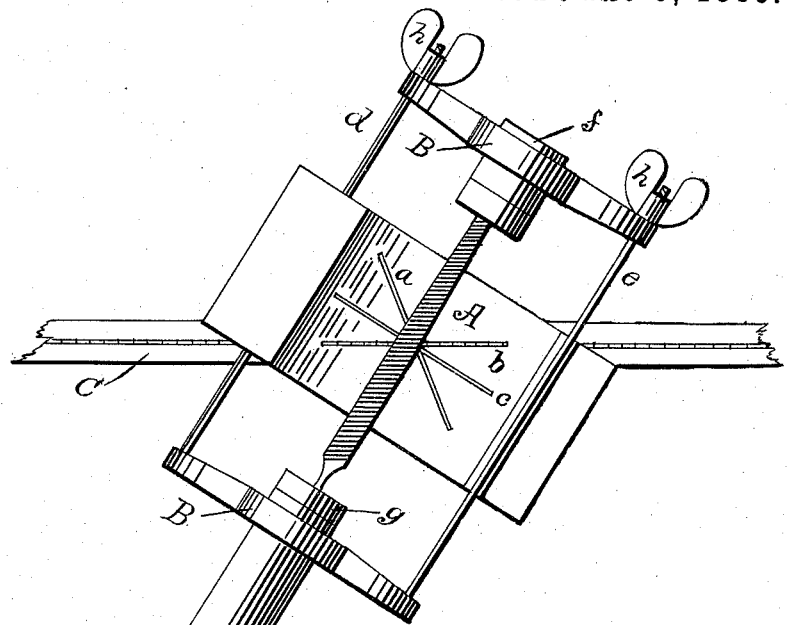
Figure 2:
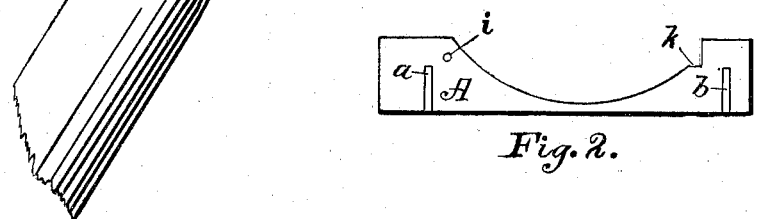

Figure 1 is a top view of the entire machine; Fig. 2, a side view of the plate A, Fig. 1; and Fig. 3, a view of the bottom of the same.

Similar letters refer to similar parts throughout the several views.

Figure 3:
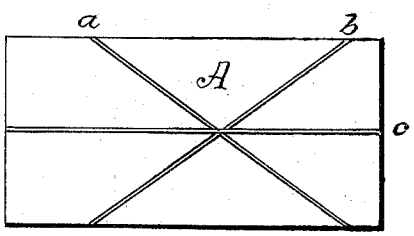

A plate, A, (shown in Figs. 1, 2, and 3,) is provided with grooves $a$ $b$ $c$, cut through from the under side of said plate, which grooves penetrate the plate to one-half of its thickness and cross each other at a common center. The groove $c$ extends through the center of the length of the plate A, as shown in Fig. 3. The top of the plate A is hollowed out, as shown in Fig. 2, to about three-fourths of its thickness, the grooves $a$, $b$, and $c$ appearing as shown in Fig. 1. The saw C, Fig. 1, is secured in the ordinary manner between two adjustable jaws. The file is fixed in an ordinary wooden handle, $g$, Fig. 1, the point penetrating a wooden ferruled plug, $f$. Two crossbars, B B, having circular openings—one for the admission of the handle $g$ and the other containing the wooden plug $f$—are connected by the two rods $d$ $e$, one end of each of said rods being threaded, and provided with nuts $h$ $h$, for setting up the frame or rack thus constructed to the variation in length of the tools used. The rod $d$ works in a longitudinal opening, $i$, Figs. 1 and 2, in the side of the plate A, and the plate and frame or rack are thus connected. The rod $e$ rests upon a shoulder, $k$, Fig. 2, of the plate A.

The method of operating my device is to slide the plate A over the teeth of the saw in the desired position—the saw, to the depth of the teeth, entering the groove, and protruding up through the center of the hollowed part of the plate. The file is operated in the usual manner, the handle of which is turned slightly from right to left to raise the file off the work on the backward stroke.

Owing to my method of securing the file, as previously shown and described, I am enabled to utilize the entire cutting-surface of the tool—a feature not shown in other devices of a like nature.

What I claim as my invention, and desire to secure by Letters Patent, is—

In a machine for filing saws, the plate A, provided with the intersecting grooves or openings $a$ $b$ $c$, in combination with the crossbars B B, rods $d$ $e$, and nuts $h$ $h$, substantially as shown, and for the purpose specified.

CHARLES FRANK HILL.

Witnesses:
J. GILBERT SHIRLEY,
PH. BERGMANN.